United States Patent
Deckers et al.

(10) Patent No.: US 8,292,611 B2
(45) Date of Patent: Oct. 23, 2012

(54) COOLING ASSEMBLY COMPRISING SEVERAL COOLING PINS FOR COOLING HOLLOW MOULDED PLASTIC PIECES BY MEANS OF A COOLING FLUID FLOW BOOSTED BY VENTURI EFFECT

(75) Inventors: Jan Deckers, Brecht (BE); Roald Duchateau, Brasshaat (BE)

(73) Assignee: La Seda de Barcelona S.A., Barcelona (ES)

( * ) Notice: Subject to any disclaimer, the term of this patent is extended or adjusted under 35 U.S.C. 154(b) by 82 days.

(21) Appl. No.: 12/744,414

(22) PCT Filed: Nov. 10, 2008

(86) PCT No.: PCT/EP2008/009456
§ 371 (c)(1),
(2), (4) Date: May 24, 2010

(87) PCT Pub. No.: WO2009/068175
PCT Pub. Date: Jun. 4, 2009

(65) Prior Publication Data
US 2010/0255138 A1    Oct. 7, 2010

(30) Foreign Application Priority Data
Nov. 27, 2007  (EP) .................................... 07022925

(51) Int. Cl.
*B29C 49/64* (2006.01)

(52) U.S. Cl. .......................... 425/446; 425/526; 425/547
(58) Field of Classification Search .................. 425/526, 425/547, 445, 446
See application file for complete search history.

(56) References Cited

U.S. PATENT DOCUMENTS

| | | | |
|---|---|---|---|
| 2,641,022 A | 6/1953 | Kress | |
| 5,028,376 A | 7/1991 | Vanderwoude | |
| 6,475,415 B1 * | 11/2002 | Neter et al. | 425/547 |
| 6,802,705 B2 * | 10/2004 | Brand et al. | 425/526 |
| 6,817,855 B2 | 11/2004 | Unterlander et al. | |
| 6,951,452 B2 | 10/2005 | Unterlander et al. | |
| 7,052,270 B2 | 5/2006 | Unterlander et al. | |
| 7,056,465 B2 | 6/2006 | Unterlander et al. | |
| 7,264,463 B2 | 9/2007 | Domodossola et al. | |
| 2006/0263467 A1 | 11/2006 | Domodossola et al. | |

FOREIGN PATENT DOCUMENTS
EP    0 947 304 A2    10/1999
* cited by examiner

*Primary Examiner* — Robert B Davis
(74) *Attorney, Agent, or Firm* — Reinhart Boerner Van Deuren P.C.

(57) ABSTRACT

The cooling assembly comprising several cooling pins (1) that are connected to the same fluid inlet. Each cooling pin (1) is adapted to cool a molded hollow plastic piece (P), and comprises a hollow blowing pipe (2) having a fluid inlet (20*a*) at one end and at least one fluid outlet (21*a*) at the opposite end, and fluid boosting means (3) for boosting by Venturi effect the cooling fluid flow at the inlet (20*a*) of the blowing pipe (2). The cooling assembly can be mounted on a molding machine, and in particular an injection molding machine.

26 Claims, 5 Drawing Sheets

COOLING ASSEMBLY COMPRISING SEVERAL COOLING PINS FOR COOLING HOLLOW MOULDED PLASTIC PIECES BY MEANS OF A COOLING FLUID FLOW BOOSTED BY VENTURI EFFECT

CROSS-REFERENCE TO RELATED APPLICATIONS

This patent application is the National Stage of International Application No. PCT/EP2008/009456, filed Nov. 10, 2008, that claims the benefit of European Application No. 07022925.7, filed Nov. 27, 2007, the entire teachings and disclosure of which are incorporated herein by reference thereto.

FIELD OF THE INVENTION

The present invention relates to the cooling of hollow moulded plastic pieces after the moulding operation is finished. The invention is more particularly useful in the field of injection blow moulding for post mould cooling a plastic piece before ejection of the said moulded piece from the injection mould. Preferably, the hollow moulded pieces are plastic preforms. In this technical field, the invention mainly relates to an improved cooling pin comprising a hollow pipe that can be introduced inside the hollow plastic piece and that is used for introducing a cooling fluid inside the plastic piece.

PRIOR ART

A variety of post mould cooling methods are currently used on injection moulding machines in order to obtain a rapid and efficient cooling of freshly moulded plastic hollow pieces, such as for example plastic preforms. In particular, in the field of injection stretch-blow moulding, the cooling of the preforms, after the moulding operation is finished and before the ejection of the preforms from the injection mould, is a critical manufacturing step that has an impact on the quality of the preforms.

Some examples of method and apparatus for post mould cooling hollow plastic pieces, and in particular preforms, are disclosed notably in the following publications: U.S. Pat. Nos. 6,817,855, 6,951,452, 7,052,270, 7,056,465, and US patent application 2006/0263467.

Such known cooling method and apparatus generally comprise cooling pins that are used for introducing a flow of cooling fluid (cooling air and/or cooling inert gas such as Nitrogen) inside the hollow pieces, in order to quickly and efficiently cool down the wall of the plastic pieces.

A cooling pin usually comprises a hollow pipe, designed to be inserted inside one plastic piece. The hollow pipe has at one end an inlet for the cooling fluid and at the opposite end an outlet for the cooling fluid. The inlet is connected to a source of compressed cooling fluid. During the cooling operation, the hollow pipe is inserted inside the plastic piece. The cooling fluid that is introduced under pressure inside the hollow pipe is exhausted via the outlet of the pipe inside the plastic piece.

In practise, in a cooling apparatus, several cooling pins are mounted on one plate and are aligned in several parallel rows. The source of compressed cooling fluid is connectable to a manifold or the like for distributing in parallel the cooling fluid under pressure to all stages of cooling pins of the plate. The plate is moveable automatically between a cooling position, wherein all the cooling pins of the plate are introduced inside the plastic pieces freshly formed in the mould cavity, and a rest position wherein the cooling pins of the plate are positioned outside the mould cavity.

Once the cooling cycle is finished, the plastic pieces are automatically ejected from the cavity mould.

The source of compressed cooling fluid is designed to supply the different cooling pins with cooling fluid under a predetermined pressure. The fluid distribution between this source of compressed cooling fluid and the different rows of cooling pins of one plate creates however a non uniform distribution of fluid pressure between the cooling pins. This pressure unbalance between the cooling pins is detrimental for the quality of the cooling operation; in particular, the cooling pin supplied with the lower cooling fluid pressure can lead to a non optimal cooling of the corresponding plastic piece, and in the worst case to a defective cooling that is detrimental for the quality of the plastic pieces.

Another drawback of the cooling apparatus of the prior art is the high consumption of energy for the cooling operation.

OBJECTS OF THE INVENTION

One main and general objective of the invention is to propose a novel technical solution that generally improves the cooling of freshly moulded hollow plastic pieces, by means of a cooling fluid introduced inside the plastic pieces.

A more particular objective of the invention is to propose a novel technical solution that enables to lower the pressure unbalance between several cooling pins connected to the same cooling fluid supplying means, during the cooling operation of freshly moulded hollow plastic pieces.

Another objective of the invention is to propose novel technical solution that requires less energy for cooling freshly moulded hollow plastic pieces, by means of a cooling fluid introduced inside the plastic pieces.

SUMMARY OF THE INVENTION

Theses objectives are achieved by the novel cooling assembly that is defined in claim 1.

Said cooling assembly comprises several cooling pins that are connected to the same fluid inlet. Each cooling pin is adapted to cool a moulded hollow plastic piece. In particular, each cooling pin is used for introducing a cooling fluid inside a hollow moulded plastic piece.

Each cooling pin of the assembly comprises:
a hollow blowing pipe having a fluid inlet at one end and at least one fluid outlet at the opposite end, and
fluid boosting means for boosting by Venturi effect the cooling fluid flow at the inlet of the blowing pipe.

Preferably, but not necessarily, the cooling pins of the assembly are adapted in order to obtain a pressure unbalance between the cooling pins of the cooling assembly that is less than 5%, and more preferably less than about 1%.

A further object of the invention is a moulding machine equipped with at least one aforesaid cooling assembly. The moulding machine is preferably an injection moulding machine, but could be also for example an extrusion blow-moulding machine.

A further object of the invention is the use of the aforesaid cooling assembly for post mould cooling hollow plastic pieces, and in particular but not necessarily, preforms.

BRIEF DESCRIPTION OF THE DRAWINGS

The technical characteristics and advantages of the invention will appear more clearly on reading the following detailed description which is made by way of non-exhaustive and non-limiting examples, and with reference to the appended drawings, as follows.

DETAILED DESCRIPTION

Figure 1:
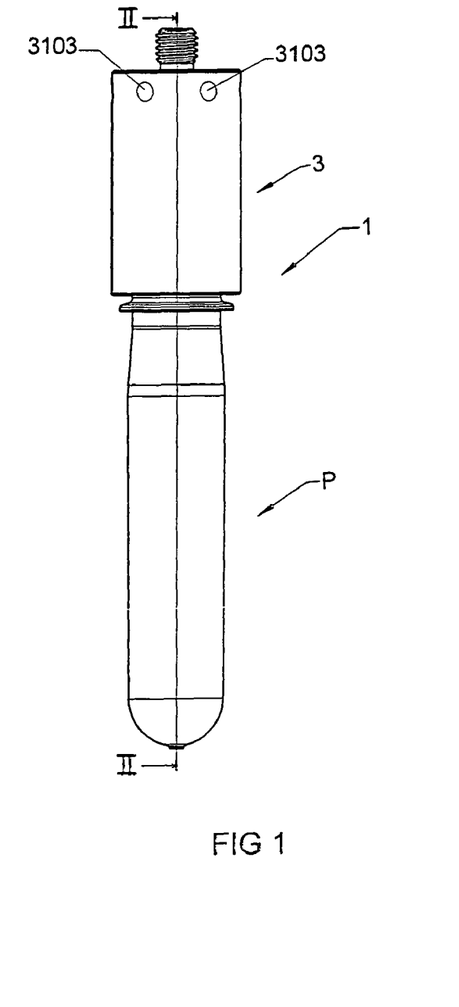
FIG. 1 is a front view of a cooling pin of the invention positioned on a preform.
Figure 2:
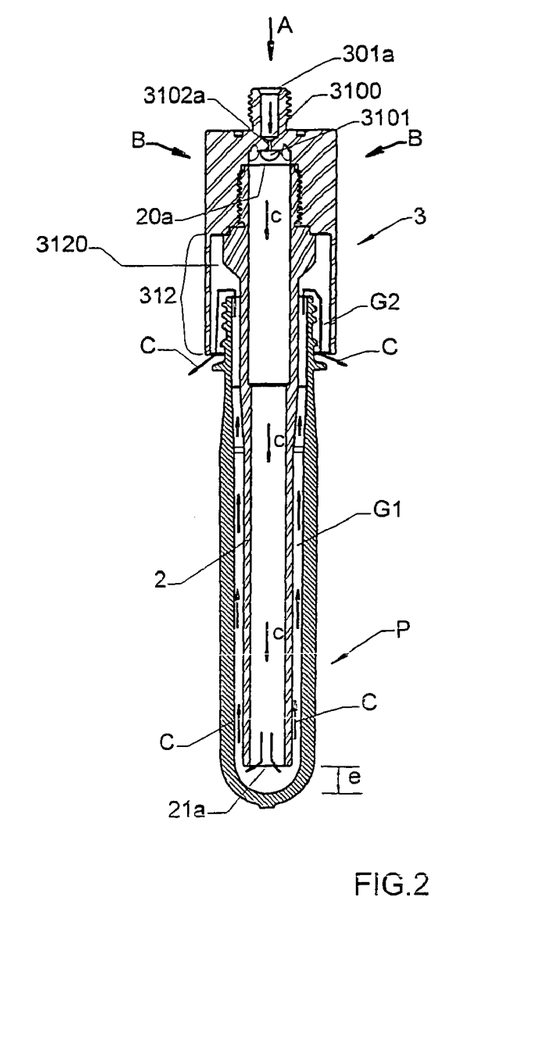
FIG. 2 is a view in cross section of the cooling pin and preform of FIG. 1 in section plane II-II.
Figure 3:
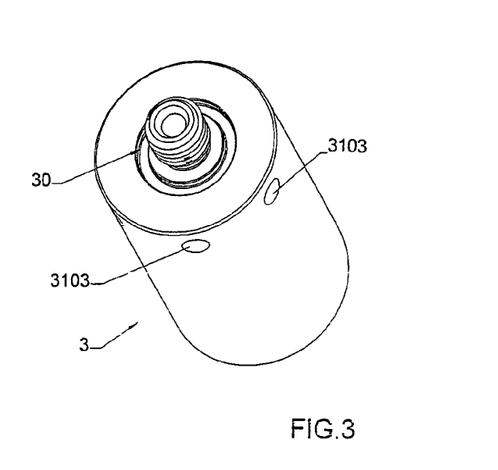
FIGS. 3 and 4 are perspective views of the fluid boosting means of the cooling pin of FIGS. 1 and 2.
Figure 4:
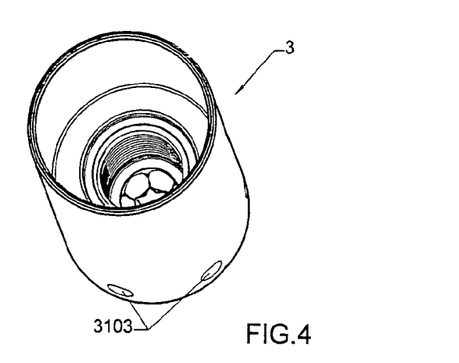
Figure 5:
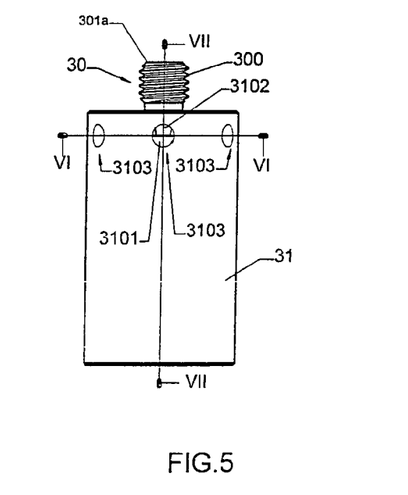
FIG. 5 is a front view of the fluid boosting means of FIGS. 3 and 4

Referring to FIGS. 1 and 2, a cooling pin 1 of the invention is positioned on a plastic preform P that has been freshly moulded. In this preferred embodiment, the cooling pin 1 is made of two assembled metal pieces: a blowing pipe 2 and fluid boosting means 3 referred hereafter as booster 3.

Figure 8:
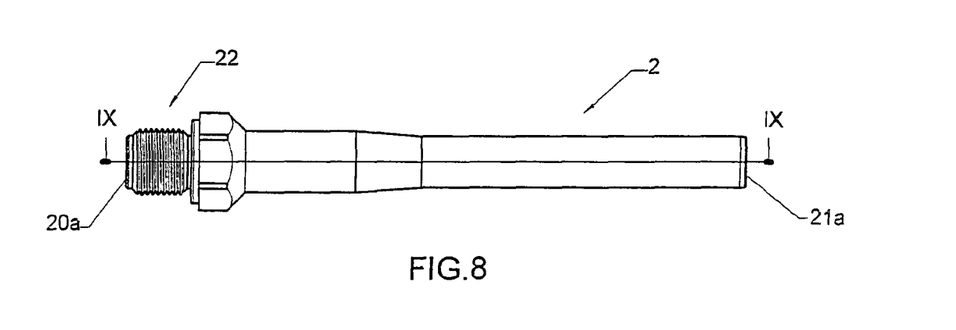
FIG. 8 is a front view of the blowing pipe of the cooling pin of FIGS. 1 and 2.
Figure 9:
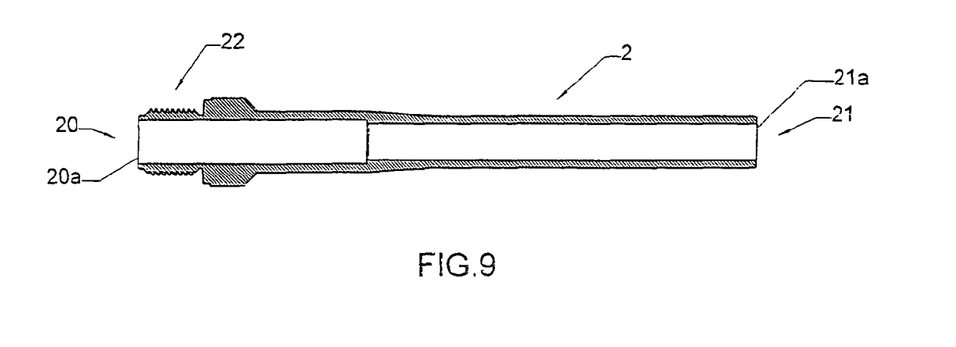
FIG. 9 is a view in cross section of the blowing pipe of FIG. 8 in section plane IX-IX.

Referring to FIGS. 8 and 9, the blowing pipe 2 is a rectilinear hollow tube that is opened at both ends 20 (proximal end) and 21 (distal end). The opening 20a in proximal end 20 constitutes an inlet for the cooling fluid, and the opposite opening 21a in the distal end 21 constitutes an outlet for the cooling fluid.

The blowing pipe 2 further comprises an external thread 22 for assembling the pipe 2 with booster 3.

Referring to FIGS. 3 to 7, booster 3 is made of one single piece comprising a first cylindrical connecting part 30 of small diameter and a second cylindrical part 31 of higher diameter.

The first cylindrical connecting part 30 is used for quickly assembling the booster 3 with cooling fluid supplying means, and for example with a cooling fluid manifold. For that purpose, the first cylindrical part 30 comprises an external thread 300.

The first cylindrical connecting part 30 is also used for supplying the second cylindrical part 31 with cooling fluid under pressure coming from the cooling fluid supplying means (manifold). For that purpose, the first cylindrical part 30 comprises an internal cylindrical cavity 301 passing through the cylindrical part 30 and terminated at both ends by opening 301a (inlet for the cooling fluid coming from the manifold) and opening 301b.

The second cylindrical part 31 is made of three parts: a first part 310 that constitutes a Venturi booster, a second intermediate part 311, and third hollow cylindrical part 312.

Figure 7:
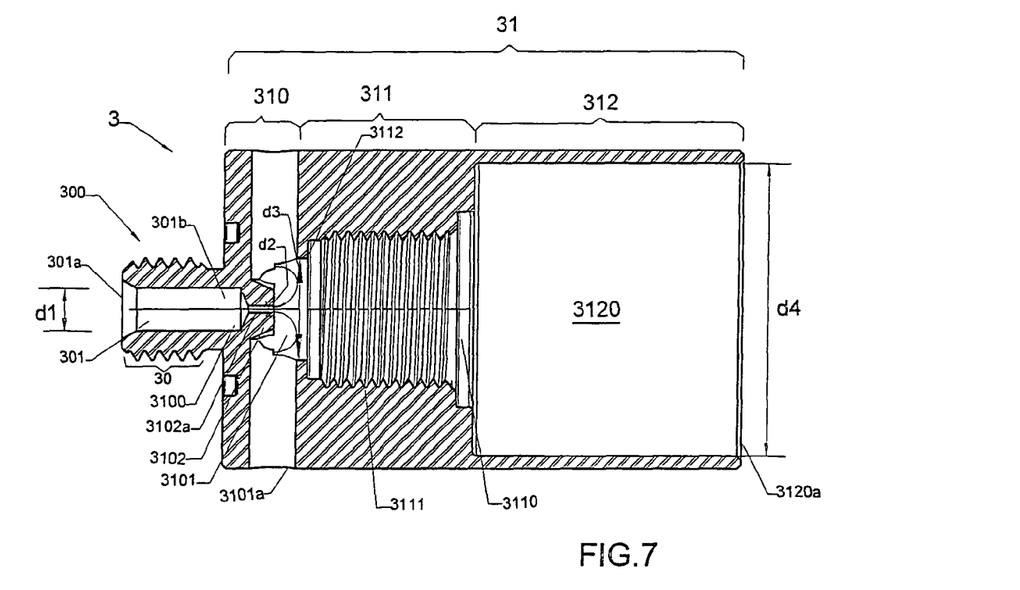
FIG. 7 is a view in cross section of the fluid boosting means of FIG. 5 in section plane VII-VII.

Referring to FIG. 7, the Venturi booster 310 comprises a first chamber 3100 and a second chamber 3101. First chamber 3100 communicates with second chamber 3101 through an axial Venturi nozzle 3102.

The Venturi nozzle 3102 is traversed by an axial bore 3102a of very small diameter d2 that opens at both ends into a tapering part of the first chamber 3100 and into the second chamber 3101. The first chamber 3100 communicates at one end with cavity 301 of connecting part 30, and defines an inlet section of diameter d1 for the cooling fluid. Diameter d1 is greater than diameter d2 of the bore 3102a of the Venturi nozzle 3102.

Figure 6:
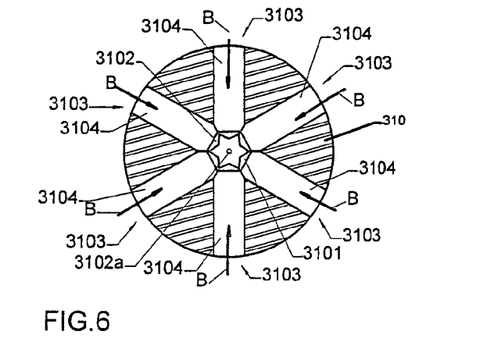
FIG. 6 is a view in cross section of the fluid boosting means of FIG. 5 in section plane VI-VI.

The Venturi booster 310 further comprises several external openings 3103 of large diameter that are drilled and preferably regularly spaced apart on the whole circumference of the Venturi booster 310. Each opening 3103 communicates with the second internal chamber 3101 of the Venturi booster 310 through a radial internal channel 3104 (FIG. 6). Each opening 3103 and channel 3104 are used for sucking air from the outside of the Venturi booster 310. In the particular embodiment of FIG. 6, there are six external openings 3103. In another variant of the invention, the number of external openings 3103 could be different.

The intermediate part 311 comprises an internal cylindrical cavity 3110 having an internal screw thread 3111 designed to cooperate with thread 22 of pipe 2 for quickly fastening pipe 2 with booster 3. This internal cavity 3110 is opened at both ends and communicates at one end with the second chamber 3101 of the Venturi booster 310 via an opening 3112 of diameter d3, and at the opposite end with the cylindrical internal cavity 3120 of third part 312. On FIG. 7, the internal diameter of cavity 3120 is referred d4. This cavity 3120 is opened (opening 3120a on FIG. 7) on the side of the booster 3 opposite to the intermediate part 311.

Referring to FIG. 2, for assembling the pipe 2 and the booster 3 together, the pipe 2 is positioned coaxially with the booster 3, and the threaded part 22 of the pipe 2 is inserted inside the cavity 312 of booster 3. Then the threaded part 22 of pipe 2 is manually screwed with the internal screw thread 3111 of the internal cylindrical cavity 3110 of booster 3, until the pipe 2 comes into abutment with booster 3.

When the assembly pipe 2/booster 3 is positioned onto the preform in the cooling position shown on FIG. 2, the pipe 2 is partially and coaxially introduced inside the preform P. The pipe 2 is not in contact with the preform P, in order to maintain a circumferential gap G1 between the preform body and the pipe 2 for the circulation of the cooling fluid. The preform neck is positioned inside the internal cavity 3120 of the booster 3 and is not in contact with the booster 3 in order to maintain a circumferential gap G2 between the preform neck and the wall of internal cavity 3120, for the circulation of the cooling fluid.

The depth of introduction of the pipe 2 inside the preform P (FIG. 2/distance (e) between the outlet 21a of pipe 2 and the bottom of the preform 2) will be knowingly set by one skilled in the art, in order to optimize the cooling of the preform wall by the cooling fluid.

Referring to FIG. 2, during the cooling operation of the preform P, a first flow of cooling fluid is supplied by a compressor (for example air under pressure or inert gas such as for example $N_2$ or $CO_2$) and is introduced in the booster 3 via inlet 301a (arrow A). This first cooling fluid A flow penetrates into the first chamber 3100, then in bore 3102a of Venturi nozzle 3102, and then in the second chamber 3101. Due to diameter reduction obtained with the bore 3102a of the Venturi nozzle 3102 (from diameter d1 to diameter d2), this first cooling fluid flow A creates inside the second chamber 3101 a suction effect, commonly referred as Venturi effect. This suction effect leads to the formation of secondary air flows (Arrows B) coming from the outside ambient air and sucked into the second chamber 3101 via openings 3103 and channels 3104 (FIG. 6).

The first cooling fluid flow A and the secondary air flows B are mixed in the second chamber 3101 into a third cooling flow C that penetrates inside the pipe 2, via opening 20a.

Advantageously, thanks to this Venturi suction effect, the cooling flow C (speed and rate) at the inlet 20a of pipe 2 is higher than the first cooling flow A at the inlet 3101a of booster 3.

This cooling flow C is directed toward the outlet 21a of the distal end 21 of pipe 2, and is then evacuated inside the preform P via outlet 21a, and in the vicinity of the preform bottom. This fluid flow C circulates inside the preform P within the gap G1 between the pipe 2 and the preform P, towards the neck of the preform, thereby cooling down the inside of the preform P on the whole length of the preform. This cooling flow C goes outside the preform P and is evacuated outside the booster 3 through gap G2 between the booster 3 and the preform neck, thereby cooling down the inside and outside of the neck.

Experimental Results

Figure 10:
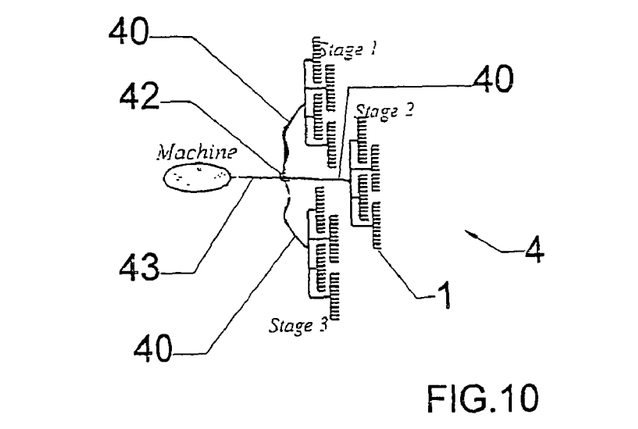
FIG. 10 is a schematic representation of a three stages moulding machine.
Figure 11:
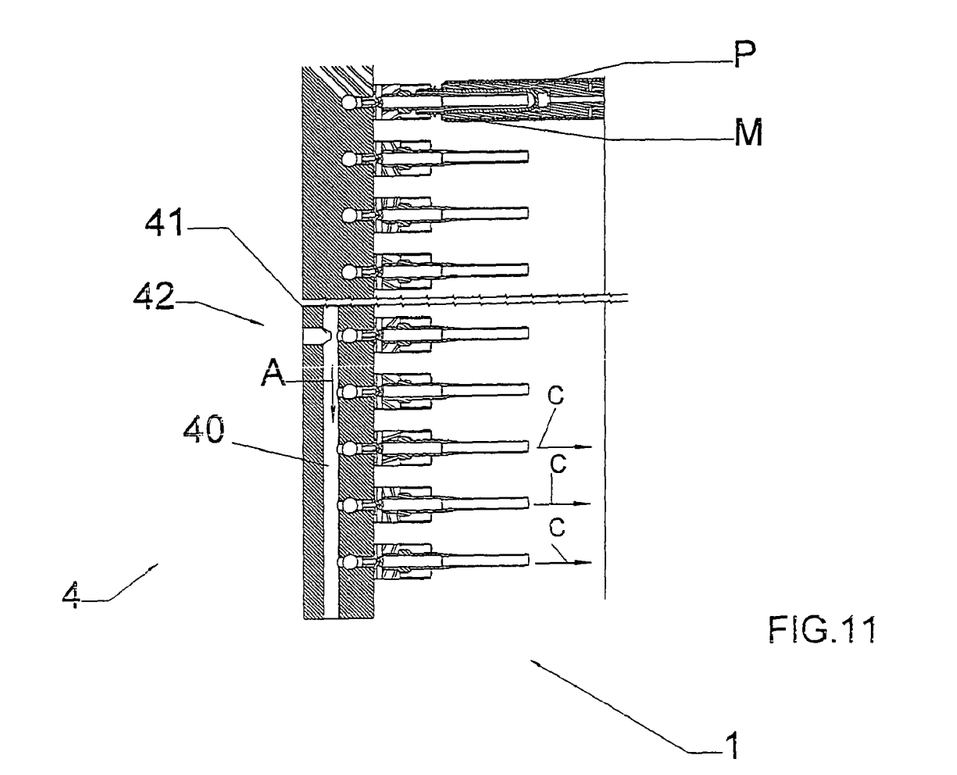
FIG. 11 is a drawing of one cooling plate equipped with cooling pins.

Experimental tests have been performed with a standard three stages injection moulding machine Husky G2/300 machine number 112186158, designed for moulding preforms P in moulds M (FIGS. 10 and 11). The injection moulding machine was equipped with a standard cooling robot. The cooling plate 4 of the cooling robot was equipped with rows of cooling pins distributed in three stages. The stages of cooling pins of plate 4 were connected to a manifold 40 having a fluid inlet 41 equipped with a connector 42. The connector 42 was used for connecting the manifold inlet 41 to a cooling fluid supplying duct 43. The duct 43 was connected to a compressor for supplying cooling air under pressure.

Figure 12:
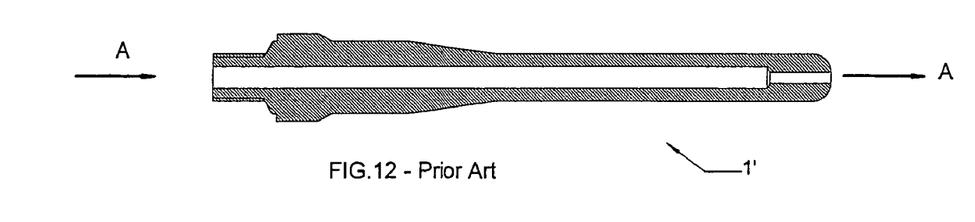
FIG. 12 is a view in cross section of standard blowing pipe of the prior art

Monolayer PET preforms P were manufactured and cooled by using the same injection and cooling process, but with two different types of cooling pins: standard Husky cooling pin 1' as the one shown on FIG. 12 and the new cooling pin 1 of the invention.

Pressure Balance Evaluation

For each test, the inlet pressure for each plate 4 and the inlet pressure for each row of cooling pins were measured.

Standard Cooling Pin 1'

The machine pressure was set to 5 bars, and the three stages were operated simultaneously. With standard cooling pins 1', the air pressure at the inlet of one stage was around 400 mbar. The air pressure for each row of cooling pins 1' was ranging from 90 mbar to 63 mbar (for the central row). The pressure unbalance was thus around 30%. The central rows of each plate have less pressure, which in turns leads to less cooling flow inside the preform and a less cooling efficiency.

Cooling Pin of the Invention

The machine pressure was set to 3 bars, and the three stages were operated simultaneously. With cooling pins 1 of the invention, the air pressure at the inlet of one stage was around 1990 mbar. The air pressure for each row of cooling pins 1 was ranging from 1980 mbar to 1975 mbar (for the central row). The pressure unbalance was thus around 1%.

The use of cooling pins of the invention dramatically improves the pressure unbalance between the rows of pins. The cooling flow is thus advantageously more uniform in all the preforms P.

Cooling Capacity Evaluation

A picture of the preforms was taken with an Infra red camera in order to obtain a thermal image of the cooled preforms. The picture of a cooled preform was taken 1 minute after the preform has dropped on the out feed conveyor of the injection machine, in order to give time for the heat to migrate to the surface of the preform.

This thermal evaluation showed that by using the same injection process for moulding the preforms (28 s cycle time) with identical blow times (18 s on three stages), a similar preform temperature could be reached by using 3 bars inlet pressure with the cooling pins 1 of the invention compared to 5 bars inlet pressure for the standard pins 1.

Flow Measurements

Air flow was measured at the outlet of the cooling air supplying means (compressor) of the machine for different machine pressure.

The results for the cooling pins 1 of the invention are summarized hereafter in table I.

TABLE I

Flow measurement - cooling pins of the invention

| | Machine pressure | | | |
|---|---|---|---|---|
| | 2 bars | 3 bars | 4 bars | 5 bars |
| 1 stage actuated | 1.1m³/min | 1.4m³/min | 1.8m³/min | 2m³/min |
| 2 stages actuated | 1.9m³/min | 2.4m³/min | 2.7m³/min | 3.1m³/min |
| 3 stages actuated | 2.4m³/min | 3m³/min | 3.6m³/min | 3.9m³/min |

The results for standard cooling pins 1 are summarized hereafter in table II.

TABLE II

Flow measurement -standard cooling pins

| Machine pressure | 3 bars | 5 bars |
|---|---|---|
| 1 stage actuated | 3.4m³/min | 4.6m³/min |
| 2 stages actuated | Max scale (5m³/min) | Max scale (5m³/min) |
| 3 stages actuated | NA | NA |

These results show that the fluid consumption of a plate equipped with standard cooling pins is dramatically higher than the consumption of a plate equipped cooling pins of the invention.

Figure 13:
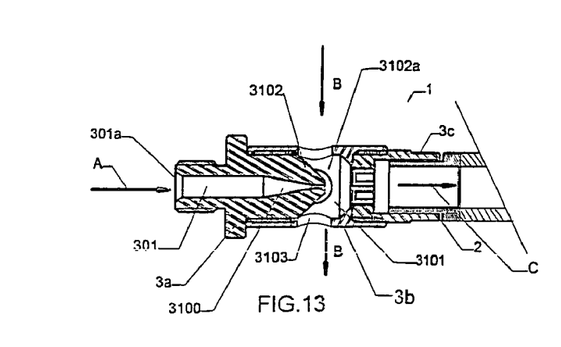
FIG. 13 is a view in cross section of another variant of cooling pin of the invention.
Figure 14:
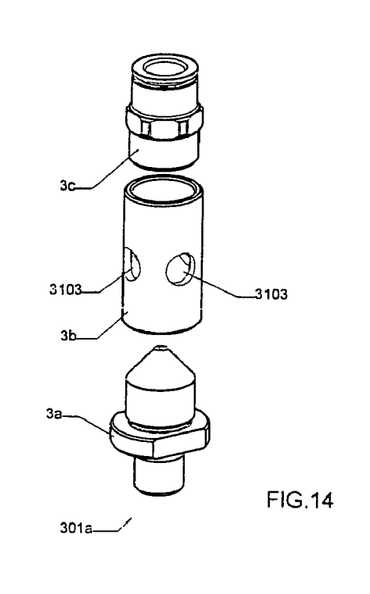
FIG. 14 is an exploded view of the three pieces that constitutes the fluid boosting means of the cooling pin of FIG. 13, once the said three pieces are assembled together.

The invention is not limited to the particular two-pieces structure of the cooling pin 1 of FIGS. 1 to 9. For example, referring to FIG. 13, the cooling pin 1 of the invention can be made of four pieces assembled together: a cooling pipe 2, and a booster 3 made of three pieces 3a, 3b and 3c. In another variant, the booster 3 can be made of two pieces. In another variant, the cooling pin 1 of the invention can also be made in one single piece.

The invention is not limited to the cooling of preforms, but the cooling pin of the invention can be used for cooling any freshly moulded hollow plastic piece. The invention can be applied in any moulding technology used for manufacturing hollow plastic pieces, and can be also used for example in extrusion blow-moulding technology.

The invention claimed is:

1. A cooling assembly comprising several cooling pins that are connected to the same fluid inlet, wherein each cooling pin is adapted to cool a moulded hollow plastic piece, comprises a hollow blowing pipe having a fluid inlet at one end and at least one fluid outlet at the opposite end, and fluid boosting means for boosting by Venturi effect the cooling fluid flow at the inlet of the blowing pipe and wherein the fluid boosting means comprise a first chamber having a cooling fluid inlet and connected to a second chamber by at least a bore of small diameter, and at least one suction opening that communicates with the second chamber, and wherein said second chamber communicates with the blowing pipe inlet, in such a way that a first cooling flow, that is introduced inside the first chamber, passes through the bore, enters into the second chamber and creates by suction effect a second air flow that is sucked into the second chamber through each suction opening, the first and second flows forming a cooling flow that enters into the blowing pipe.

2. The cooling assembly of claim 1, wherein a cooling pin comprises several suction openings on the periphery of the second chamber.

3. The cooling assembly of claim 1, wherein the fluid boosting means and the blowing pipe comprises assembling means for detachably fastening the fluid boosting means and the blowing pipe together.

4. The cooling assembly of claim 3, wherein the assembling means comprises threads for screwing the fluid boosting means and the blowing pipe together.

5. The cooling assembly of claim 1, wherein the fluid boosting means are made of a single piece.

6. A moulding machine equipped with at least one cooling assembly according to claim 1.

7. A cooling pin adapted to cool a moulded hollow plastic piece, and comprising a hollow blowing pipe having a fluid inlet at one end and at least one fluid outlet at the opposite end, and fluid boosting means for boosting by Venturi effect the cooling fluid flow at the inlet of the blowing pipe and wherein the fluid boosting means comprise a first chamber having a cooling fluid inlet and connected to a second chamber by at least a bore of small diameter, and at least one suction opening that communicates with the second chamber, and wherein said second chamber communicates with the blowing pipe inlet, in such a way that a first cooling flow, that is introduced inside the first chamber, passes through the bore, enters into the second chamber and creates by suction effect a second air flow that is sucked into the second chamber through each suction opening, the first and second flows forming a cooling flow that enters into the blowing pipe.

8. The cooling pin of claim 7, comprising several suction openings on the periphery of the second chamber.

9. The cooling pin of claim 7, wherein the fluid boosting means and the blowing pipe comprises assembling means for detachably fastening the fluid boosting means and the blowing pipe together.

10. The cooling pin of claim 9, wherein the assembling means comprises threads for screwing the fluid boosting means and the blowing pipe together.

11. The cooling pin of claim of claim 7, wherein the fluid boosting means are made of a single piece.

12. A moulding machine equipped with at least one cooling pin according to claim 7.

13. A cooling assembly comprising several cooling pins that are connected to the same fluid inlet, wherein each cooling pin is adapted to cool a moulded hollow plastic piece, and comprises a hollow blowing pipe having a fluid inlet at one end and at least one fluid outlet at the opposite end, and fluid boosting means for boosting by Venturi effect the cooling fluid flow at the inlet of the blowing pipe, and wherein said fluid boosting means communicate with the blowing pipe inlet and comprise a cooling fluid inlet and at least one suction opening in such a way that a first cooling flow, that is introduced inside the fluid boosting means through the cooling fluid inlet, creates by suction effect a second air flow that is sucked into the fluid boosting means through each suction opening, the first and second flows forming a cooling flow that enters into the blowing pipe through the fluid inlet of the blowing pipe.

14. The cooling assembly of claim 13, wherein the fluid boosting means comprise a first chamber having a cooling fluid inlet and connected to a second chamber by at least a bore of small diameter, and at least one suction opening that communicates with the second chamber, and wherein said second chamber communicates with the blowing pipe inlet, in such a way that a first cooling flow, that is introduced inside the first chamber, passes through the bore, enters into the second chamber and creates by suction effect a second air flow that is sucked into the second chamber via each suction opening, the first and second flows forming a cooling flow that enters into the blowing pipe.

15. The cooling assembly of claim 13, wherein a cooling pin comprises several suction openings on the periphery of the second chamber.

16. The cooling assembly of claim 13, wherein the fluid boosting means and the blowing pipe comprises assembling means for detachably fastening the fluid boosting means and the blowing pipe together.

17. The cooling assembly of claim 16, wherein the assembling means comprises threads for screwing the fluid boosting means and the blowing pipe together.

18. The cooling assembly of claim 13, wherein the fluid boosting means are made of a single piece.

19. A moulding machine equipped with at least one cooling assembly according to claim 13.

20. A cooling pin adapted to cool a moulded hollow plastic piece, and comprising a hollow blowing pipe having a fluid inlet at one end and at least one fluid outlet at the opposite end, and fluid boosting means for boosting by Venturi effect the cooling fluid flow at the inlet of the blowing pipe, wherein said fluid boosting means communicate with the blowing pipe inlet and comprise a cooling fluid inlet and at least one suction opening in such a way that a first cooling flow, that is introduced inside the fluid boosting means through the cooling fluid inlet creates by suction effect a second air flow that is sucked into the fluid boosting means through each suction opening, the first and second flows forming a cooling flow that enters into the blowing pipe through the fluid inlet of the blowing pipe.

21. The cooling pin of claim 20, wherein the fluid boosting means comprise a first chamber having a cooling fluid inlet and connected to a second chamber by at least a bore of small diameter, and at least one suction opening that communicates with the second chamber, and wherein said second chamber communicates with the blowing pipe inlet, in such a way that a first cooling flow, that is introduced inside the first chamber, passes through the bore, enters into the second chamber and creates by suction effect a second air flow that is sucked into the second chamber via each suction opening, the first and second flows forming a cooling flow that enters into the blowing pipe.

22. The cooling pin of claim 20, comprising several suction openings on the periphery of the second chamber.

23. The cooling pin of claim 20, wherein the fluid boosting means and the blowing pipe comprises assembling means for detachably fastening the fluid boosting means and the blowing pipe together.

24. The cooling pin of claim 22, wherein the assembling means comprises threads for screwing the fluid boosting means and the blowing pipe together.

25. The cooling pin of claim of claim 20, wherein the fluid boosting means are made of a single piece.

26. A moulding machine equipped with at least one cooling pin according to claim 20.

* * * * *